United States Patent [19]

Reinaud

[11] Patent Number: 4,706,773
[45] Date of Patent: Nov. 17, 1987

[54] VEHICLE GUIDANCE SYSTEM PARTICULARLY FOR USE IN AGRICULTURE

[75] Inventor: Guy F. Reinaud, Dampierre en Yvelines, France

[73] Assignee: Imperial Chemical Industries plc, Welyn Garden City, England

[21] Appl. No.: 823,969

[22] Filed: Jan. 30, 1986

Related U.S. Application Data

[63] Continuation of Ser. No. 381,871, May 25, 1982, abandoned.

[30] Foreign Application Priority Data

Jul. 1, 1981 [GB] United Kingdom ............... 8120380

[51] Int. Cl.$^4$ .................. G06K 11/02; B62D 1/28
[52] U.S. Cl. ............................ 180/169; 172/4.5; 356/152
[58] Field of Search .......... 180/169, 167; 172/4.5; 356/152

[56] References Cited

U.S. PATENT DOCUMENTS

| 3,046,681 | 7/1962 | Kutzler | 172/4.5 |
| 3,200,400 | 8/1965 | Gill | 343/18 C |
| 3,531,205 | 9/1970 | Nussmeier | 356/152 |
| 3,641,351 | 2/1972 | Hintringer et al. | 172/4.5 |
| 3,778,168 | 12/1973 | Willner | 356/152 |
| 3,813,171 | 5/1974 | Teach | 172/4.5 |
| 4,211,921 | 7/1980 | Kanetou et al. | 180/169 |
| 4,215,273 | 7/1980 | Frosch et al. | 356/72 |
| 4,225,226 | 9/1980 | Davidson et al. | 356/152 |
| 4,457,621 | 7/1984 | Harris et al. | 356/152 |
| 4,486,095 | 12/1984 | Mitchelson | 356/152 |

FOREIGN PATENT DOCUMENTS

1448623 9/1976 United Kingdom ............... 180/168

Primary Examiner—David M. Mitchell
Attorney, Agent, or Firm—Cushman, Darby & Cushman

[57] ABSTRACT

A system for guiding a vehicle along a pre-determined rectilinear path which comprises a vehicle having a laser fixed thereon so as to direct a laser beam along the direction of motion of the vehicle towards a target carrying beam reversing means positioned on the vehicle path so as to direct the beam back to the vehicle.

6 Claims, 11 Drawing Figures

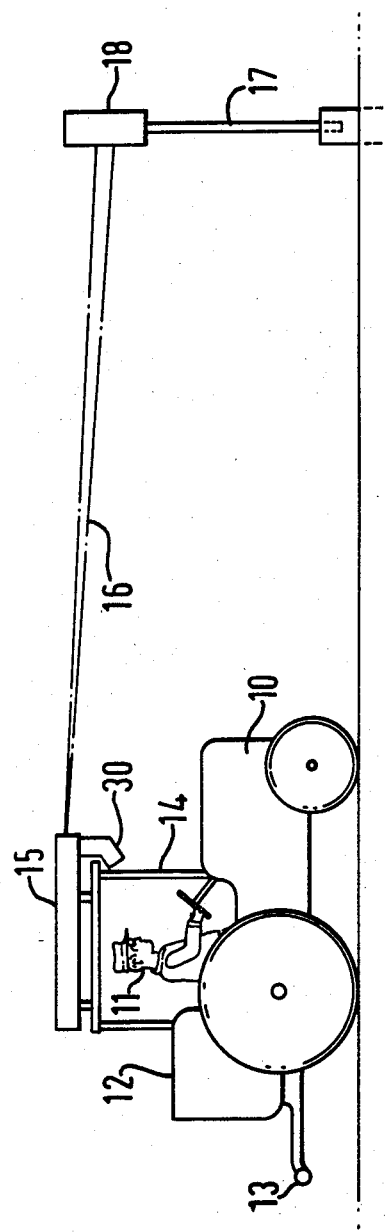
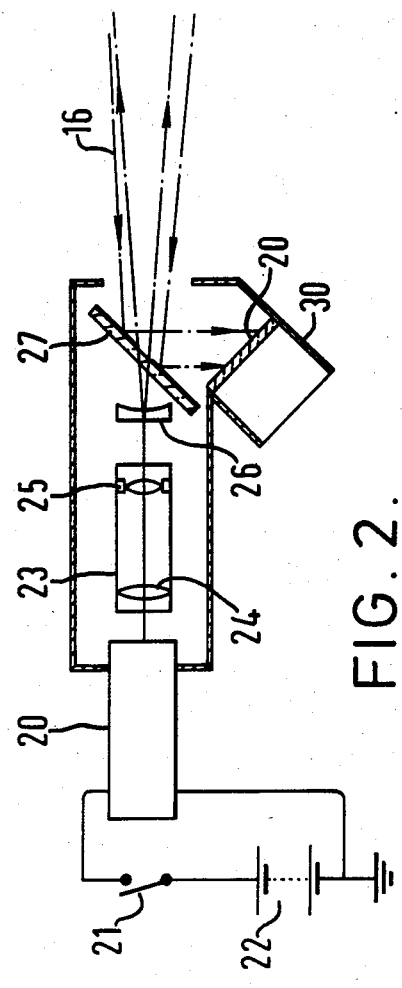
FIG. 1.
FIG. 2.

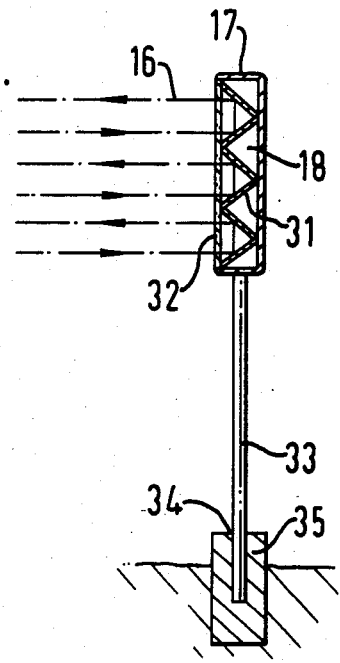
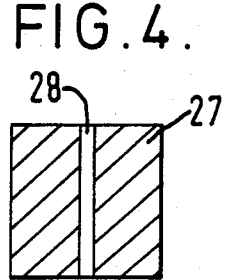
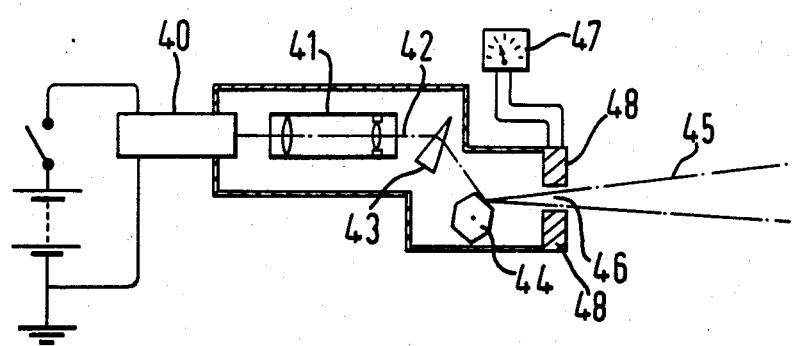

VEHICLE GUIDANCE SYSTEM PARTICULARLY FOR USE IN AGRICULTURE

This is a continuation of application Ser. No. 381,871 filed May 25, 1982, and now abandoned.

This invention relates to vehicle guidance systems, and particularly but not exclusively to systems for the guidance for vehicles used in agriculture.

In agricultural operations, it is often necessary to traverse the whole of a field with accuracy. This may be for the purpose of working the soil (ploughing, harrowing, etc) or for sowing seed, mowing or reaping. The problem of driving an accurate path is most acute when pesticides are being sprayed. Here it is particularly desirable that adjacent sprayed strips of the field should match exactly. A gap between strips leads to an unsprayed area in which pests or weeds may flourish. Overlapping strips mean that part of the field receives a double dose of chemical, which is at best wasteful and uneconomic, and at worst in certain cases may cause damage to the crop or the environment. Long spray booms (e.g. over 5 meters in length) make it even more difficult for the tractor driver to match the edges of sprayed strips.

Numerous prior methods have been proposed for overcoming this problem, including a system of foam marking at the edges of the sprayed swath. Foam marking has been used in conjunction with a system of mirrors at the tip of the boom to enable the driver to see the foam line better; with electronic sensing means for detecting the position of the foam; and even with closed circuit television. Other proposals have been made, but so far none have solved the problem effectively and economically.

The object of the present invention is to provide a more effective and practical means of guiding a vehicle, particularly an agricultural vehicle, for example a tractor, accurately along a predetermined straight path, or series of paths.

According to the present invention we provide a system for guiding a vehicle along a predetermined rectilinear path which comprises a vehicle having a laser fixed thereon so as to direct a laser beam along the direction of motion of the vehicle towards a target carrying beam reversing means positioned on the vehicle path so as to direct the beam back to the vehicle.

In some applications, the returning beam may be detected by the eye of the vehicle driver. When he can see the reflected beam, he knows that he is driving along the right line. This however has the disadvantage that the driver must constantly watch the target if he is not to lose the line. Generally therefore it is more convenient (and necessary, in the case of a driverless vehicle) to detect the reflected beam electronically, for example by means of a photo-electric cell or cells. In the case of an automatic driverless vehicle, the electronic detection means may be coupled to means controlling the direction of motion of the vehicle, so that the vehicle is steered automatically towards the beam reversing means. The detection means is preferably sited as close as possible to the turning centre of the tractor.

To overcome the problem of keeping the laser beam pointing in the correct vertical alignment to hit the target, it is convenient to spread the laser beam in the vertical plane. This may be done, for example, by the use of a cylindrical lens mounted in front of the laser with its axis in a horizontal plane, or (preferably, where longer distances are involved) by use of a rotating or vibrating mirror similarly mounted. Conveniently the beam is caused to diverge at an angle of between one and ten degrees.

Lasers for use in the invention may be visible light lasers, for example the helium neon laser producing red light of wave length 632.8 nanometers. Alternatively, infra-red lasers, e.g. carbon dioxide lasers, may be used; though these, being outside the visible light spectrum, require use with electronic detection means. With visible light lasers, powers of up to about 5 milliwatts may be used in certain situations, though it is convenient for safety reasons to restrict power output if possible to 1 to 2 milliwatts. With infra-red lasers, higher power outputs, e.g. 5 to 10 milliwatts, may be used with much greater safety.

By the expression "beam reversing means" we intend a device which returns a substantial proportion of the light falling on it along the direction in which it came. Thus, an ordinary mirror is not such a device, since it only reverses the direction of light travelling normal to the plane of the mirror. The most effective way of reversing a light beam is the so-called "corner cube", or an array of such cubes. A corner cube comprises the three adjacent sides of a hollow cube which may notionally be obtained by standing a cube on one corner and cutting it horizontally through three adjacent corners. If the inner surfaces of such a corner cube are reflective, they have the property of reversing any light ray incident on them. It is preferred to use an array of corner cubes about 20 to 50 centimeters in diameter. Alternatively, but less preferably, an array of reflective glass beads may be used (for example that sold under the trade name "Scotchlite").

Embodiments of the invention will now be described in detail with reference to the drawings, in which:

FIG. 1 is a side view of the invention in operation in a field;

FIG. 2 shows a schematic side view of the laser of FIG. 1 in further detail;

FIG. 3 shows the laser target of FIG. 1 in vertical section;

FIG. 4 is a front view of the silvered mirror of FIG. 2;

FIG. 5 is a schematic side view of a second laser and detection system for mounting on the tractor of FIG. 1;

Figure 6:
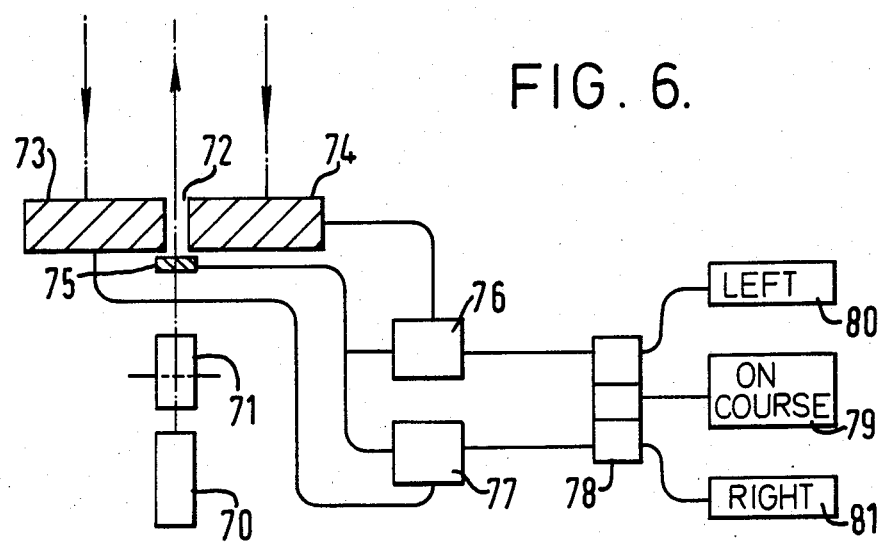
FIG. 6 is a schematic top view of a third laser and detection system for mounting on the tractor of FIG. 1.

Referring then firstly to FIGS. 1 to 4, FIG. 1 shows a tractor (10) having a driver (11) and spray tank (12) for supplying a spray boom (13). On the roof of the cabin (14) of the tractor (10) is mounted a laser system (15) shown in more detail in FIG. 2. The system (15) is arranged to project a laser beam (16) towards a target (17) (shown in more detail in FIG. 3) provided with an array of reflective corner cubes (18).

Referring now particularly to FIG. 2, the laser system (15) comprises a helium neon laser (20) of 5 milliwatts output, powered via a switch (21) from the tractor battery (22). The beam (16) emerging from the laser (20) diverges at an angle of 1 milliradian. It then passes through a beam expander consisting of a reversed astronomical telescope (23) of conventional design, comprising an objective lens (24) of large aperture and long focal length and an eye piece lens (25) of smaller aperture and shorter focal length. The telescope gives a collimated beam (16) emerging from the laser, and also aligns it accurately along the direction of motion of the tractor, at right angles to the axis of the fixed wheels and spaced midway between them. Beyond the telescope (23) is sited a planoconcave cylindrical lens (26), mounted with its axis of curvature parallel to the axis of the fixed wheels of the tractor.

Lens (26) serves to diverge laser ray (16) at an angle of 5 degrees. The diverging ray (16) now passes through a periscope mirror (27), shown in more detail in FIG. 4. It is projected towards the target (17), strikes the array of corner cubes (18) and is reversed in direction. Returning to its origin it strikes periscope mirror (27), which is fully silvered apart from a central strip (28) through which the outgoing ray (16) passes. Most of the returning ray is reflected downwards by mirror (27) on to ground glass screen (29) which is in the view of the tractor operator. Ground glass screen (29) is surrounded by a cylindrical hood (30) serving to shade it.

The target (17) is shown in more detail in FIG. 3. It comprises a circular array (18) about 30 centimeters in diameter, of reflective corner cubes (31) made from metallised plastic, and covered by a transparent plastic screen (32). The array (18) is mounted on a supporting pole (33), 2-3 meters high, having a foot (34) rectangular in section which slots into a rectangular slot in a permanent concrete block (35).

In operation, the tractor driver aligns his tractor in one corner of the field opposite a first target (17) and switches on the laser (20). The attitude of the tractor is then adjusted until a red image of the target (17) can be seen on screen (29). The spray boom (13) is switched on and the tractor driven across the field, steering so as to maintain the red image visible on screen (29). On reaching the far side of the field adjacent the target (17), the driver switches off the spray and the laser, turns the tractor, checks that the edge of the boom is correctly aligned, switches on the laser, aligns it on a second target on the opposite side of the field, and proceeds as before. Fields may be provided with targets left permanently in position; or, more economically, with slots for targets left permanently in position. In the latter case, only two targets are required but the driver must move each target from one slot to the next adjacent slot at the end of each sprayed swath.

In the case of fields which are not flat, it may be desirable to use targets supported at a height higher than 2 or 3 meters, so that they are visible from the other side of the field.

An alternative laser system for mounting on tractor (10) is illustrated diagramatically in FIG. 5. It comprises a carbon dioxide laser (40), driven as before from the tractor battery. It produces a ray which is collimated by telescope (41). From here the ray (42) is refracted through a prism (43) on to a six-sided rotating mirror (44), driven by a small electric motor (not shown). This produces a traversing beam (45) which passes out through a vertical slit (46) in the direction of target (17).

At target (17) it is reflected as before, and returned to its point of origin. Here most of it is picked up by photoelectric cells (48) surrounding the slit (46) which are sited at the turning centre of the tractor; these convert it to an electrical signal which is notified to the tractor driver by an ammeter (47).

Carbon dioxide lasers have the advantage that they can be used in misty conditions, and also that they are less hazardous to the human eye. To prevent the photoelectric cells (48) being activated by radiation sources other than the target, means may be provided for coupling the rotation rate of the mirror to the current detector so that the latter is responsive only to the signals having the same frequency as the mirror. This considerably increases the sensitivity of detection of the pulsed reflection, and enables lower power lasers to be used.

FIG. 6 shows schematically an alternative vehicle-mounted guidance system in which the returning ray is detected electronically. When the ray deviates from the target, the system shows the side to which the ray has deviated. This makes it much easier for the driver to keep on course. In FIG. 6, a laser and telescope system 70 focusses a collimated laser beam on to a mirror (71) mounted to vibrate in a vertical plane and to reflect the laser beam forwards towards the target of FIG. 3 through a slit (72) between left and right-hand silicon photoelectric detectors (73 and 74). The beam is in this way spread over a small vertical angle. A smaller and less sensitive silicon detector (75) is mounted at the bottom of slit (72) to pick up part of the outgoing laser beam signal. Laser light impinging on the target is reflected back towards its origin and part of it impinges on one or both of silicon detectors (73 and 74). These, on receiving incident light, pass electrical input signals to comparator circuits (76 and 77). These circuits are also supplied with a control signal from detector (75). Each circuit is arranged to compare the input signal with the control signal; where the two are of the same frequency, each passes an output signal, proportional to the strength of the input signal, to control circuit (78). According to the signals it receives, control circuit (78) causes dashboard tractor lights (79) ("on course"), (80) ("left") and (81) ("right") to be lit or extinguished.

The system works as follows. Corner cube reflectors are naturally not optically perfect, and we have discovered that light striking one side of such an array of cubes tends to be reflected back mainly to one side of the laser. Typically, light striking the reflector on the side to the left of the driver is reflected back mainly to the detector on the driver's right hand side, and vice versa. Accordingly, electrical signal received predominantly from one detector indicates that the laser beam is beginning to diverge to the opposite side. Thus, referring again to FIG. 6, the control circuit may be made to work according to the following logic table:

| INPUT | OUTPUT |
| --- | --- |
| Signal from 76 and 77 | Switch on light (79), "On Course". Switch off any others lit. |
| Signal mainly from 76 | Switch on light (80), "Left". Switch off any others lit. |
| Signal mainly from 77 | Switch on light (81), "Right". Switch off any others lit. |
| No input | Switch off light (79), |

| INPUT | OUTPUT |
| --- | --- |
|  | if lit. |

Thus, while the laser ray strikes the target centrally, the "On Course" light is lit. As it begins to diverge to the left (say) the "Left" light comes on. If divergence to the left continues, the "Left" light stays on even if the laser ray departs from the target completely (so that no return signal is received) until the driver corrects the vehicle's course.

Figure 7:
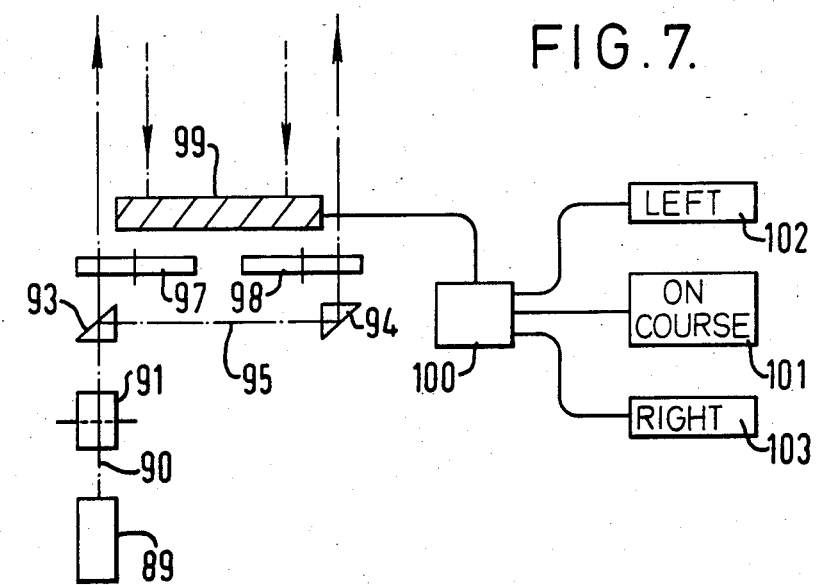
FIG. 7 is a schematic top view of a fourth laser and detection system for mounting on the tractor of FIG. 1.

In an alternative system for carrying out the same function, two laser beams are used. This is illustrated in FIG. 7. A combined laser and telescope assembly mounted on the tractor centre line (89) focusses a collimated beam (90) on to a vibrating mirror (91), which spreads the ray in the vertical plane. From the mirror (91) the ray passes to a prism (93) having a half-silvered back; this diverts part of beam (90) into a ray (95) at right angles to it. A second silvered prism (94) intercepts the deflected ray (95) and directs it again parallel to the first, at a distance about equal to the width of the target (say 40 cm). Both rays then pass through mechanical choppers (97), (98): these are radially apertured discs which rotate at high speed cutting off each ray intermittently so that each flickers with a characteristic frequency. From here rays leave the tractor in the direction of the target shown in FIG. 3. If they strike the target, they are reflected back to the tractor and picked up, at least in part, by the silicon photoelectric detector (99). This then sends electrical signals to the control circuit (100), which analyses them, and causes tractor dashboard lights (101) ("on course"), (102) ("left") and (103) ("right") to be lit or extinguished.

The control circuit (100) is supplied with the flashing frquencies of both laser rays, and can accordingly tell which is hitting the target, by comparing these frequencies with the frequencies of signals received from detector (99). It may be programmed to operate the dashboard lights as follows:

| INPUT | OUTPUT |
| --- | --- |
| Signal from left-hand ray | Switch on light (101) ("on course"); switch off other lights |
| Signal from right-hand ray | Switch on light (102) ("left"); switch off other lights |
| No signal | (a) If light (101) on - switch off light (101) and switch on light (103) ("right") (b) Otherwise - no output |

Once the left-hand ray has been aligned on the target the dashboard lights (101-103) will indicate to which side any divergence has occurred.

Alternatively, in this arrangement, the two beams may be mounted so as both to strike the target when the tractor is on its desired course. The beams are then spaced equidistantly from the centre line of the tractor at a distance apart not greater than the width of the target. The control circuit may then be programmed to operate as follows:

| INPUT | OUTPUT |
| --- | --- |
| Signal from both rays | Switch on light (101) ("on course"); switch off other lights |
| Signal from left-hand ray only | Switch on light (102) ("left") |
| Signal from right-hand ray only | Switch on light (103) ("right") |
| No signal | switch off light (101) |

In this way, when two lights are on [(101) and (102), say] this indicates that the vehicle's course is diverging slightly to one side (in this case, the left). If the vehicle continues to diverge in this sense, the "on course" light (101) will go out, but the "left" light (102) remains on, indicating the direction in which divergence has occured. Naturally, means other than lights (e.g. a direction pointer) may be used to signal this information to the vehicle driver.

The system of the invention has application to driverless vehicles. Such vehicles must of course be provided with means to correct the vehicles' course in response to signals received from the target. The apparatus shown in FIGS. 6 and 7 may be modified by replacing the dashboard indicator lights with controls which activate the vehicle steering mechanism appropriately according to the signal received, or not received, from each detector means.

Figure 8:
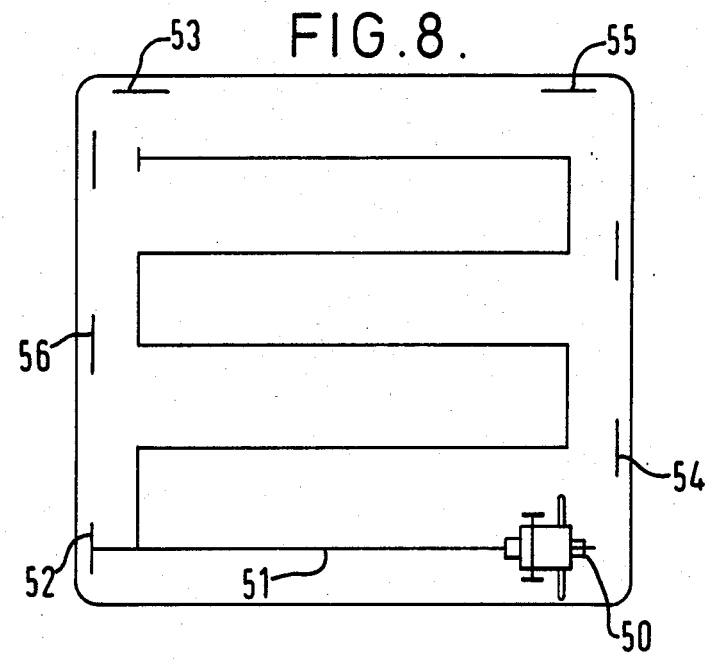
FIG. 8 is a plan view of a field laid out for traverse by a driverless vehicle provided with the system of the invention.

FIG. 8 shows a plan of a field arranged to be traversed by a driverless vehicle. The vehicle (50) proceeds along line (51) until it is within a pre-set distance of target (52). At this point it pivots automatically to the right through 90°, and the laser guidance mechanism locks on to target (53). The vehicle proceeds a predetermined short distance equal to one path width, again pivots through 90° to the right and locks on to target (54). The vehicle then traverses the field until close to target (54) and then pivots to the left to pick up target (55). It proceeds for one path width, and pivots again to the left to pick up target (56). In this way it continues to traverse the whole field, finishing opposite target (53) in the top left hand corner. Microelectronic circuitry (e.g. in the form of a dedicated silicon chip) is provided to control the movements of the vehicle in response to the reflected signals from the targets.

The guidance system described can be arranged to be effective over distances of up to a kilometer or so. When applied to driverless vehicles, for purposes of agricultural spraying, it is possible to considerably reduce weight of the equipment used, particularly when using ultra low volume spraying methods, or electrostatic spraying, or both. This reduction in weight saves fuel costs and often reduces damage to soil and crops. The invention is not necessarily confined to wheeled vehicles; it may find application with ground effect vehicles or flying machines, including fixed wing aircraft and helicopters.

The system may also find use in certain applications outside agriculture, for example in the cleaning of large industrial sites, for example airport runways, e.g. to remove snow therefrom. Another application is in the dredging of ports, canals or other waterways, in which the vehicle on which the laser is mounted may be a ship equipped with dredging means.

Figure 9:
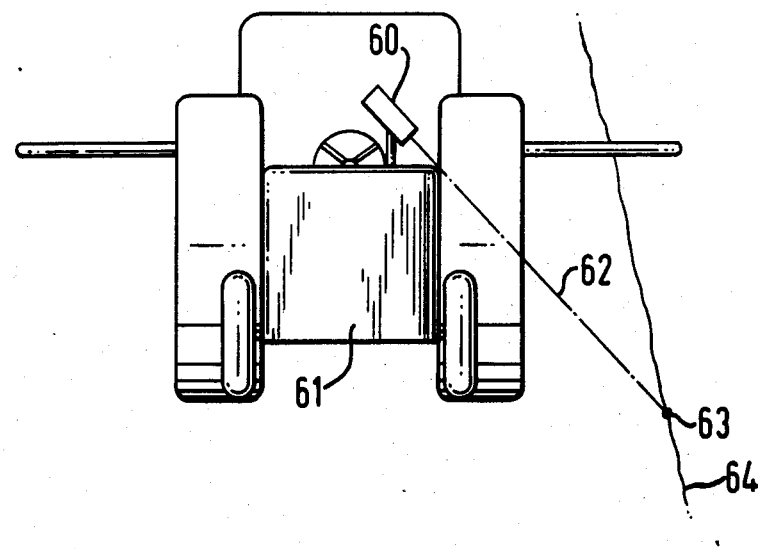
FIG. 9 is a front view of an alternative laser vehicle guidance system mounted on a tractor.

A modified form of the invention is illustrated in FIG. 9. Here a visible light laser (60) is mounted on the bonnet of a tractor (61) to direct a laser beam (62) downwards and sideways towards the soil beside the tractor. At the point at which the laser beam strikes the earth a patch of light (63) is visible to the tractor driver, and he can position the tractor by guiding the movement of the patch of light (63) along any suitable guide line (64) visible on the earth. Such a guide line might be, for example, the edge of a previously ploughed furrow, or a wheel mark in soil or crops.

Figure 10:
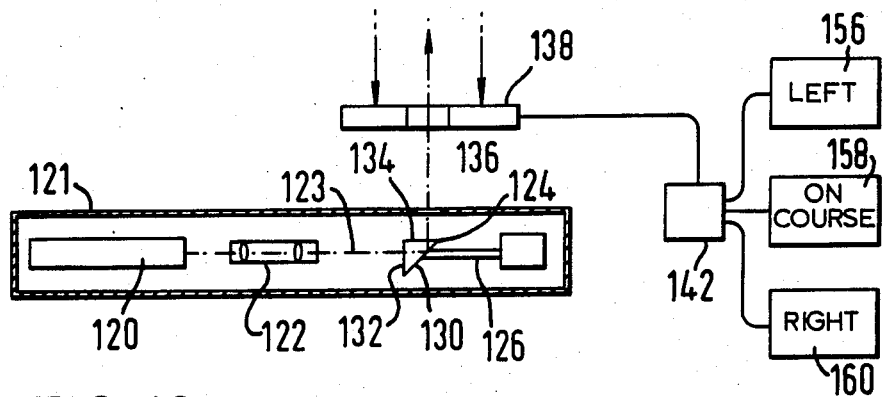
FIG. 10 is a schematic top view of a fifth laser and detection system.
Figure 11:
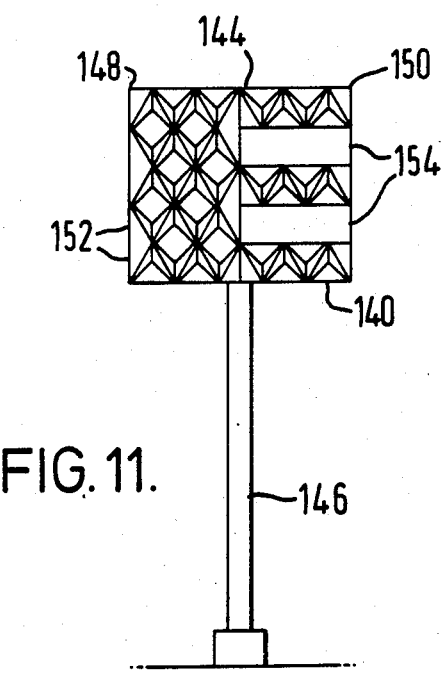
FIG. 11 is a front view of a target for use with the system shown in FIG. 10.

A further embodiment of the invention is shown in FIGS. 10 and 11. FIG. 10 shows a 5 milliwatt laser (120), housed in a cylindrical body (121) arranged to be mounted on a tractor roof (not shown) with its axis parallel to the axis of the tractor wheels. An inverted telescope (122) collimates the laser beam (123) emerging from laser (120) and passes it to a prism (124). The prism (124) is mounted on a shaft (126) for rotation by an electric motor (128). The prism (124) has the shape of an isoceles right angled triangle in cross-section, the surface (130) corresponding to the hypotenuse of the triangle being silvered. The prism (124) is oriented on the shaft (126) so that as the shaft (126) rotates one face (132) of the prism (128) remains normal to the laser beam (123) while a second face (134) remains parallel to it. Opposite the prism (124) a circular aperture (136) is provided in the wall of body (121). Outside the aperture (136) is provided an annular photoelectric silicon detector (138).

In operation, the laser (120) is activated to produce a beam (123), and motor (128) rotates shaft (126) and prism (124) at a high control speed. The beam (123) passes into the prism (124) through face (132) and is reflected at silvered face (130) to pass through face (134). In this way pulses of light emerge from aperture (136) at a frequency corresponding to the frequency of rotation of the electric motor (128). These pulses travel to target (140) (shown in more detail in FIG. 11) and (provided the tractor is correctly aimed) are reflected back from it to strike detector (138). Signals received by detector (138) are passed to control circuit (142), which analyses their frequency.

Referring in more detail to the target (140) shown in FIG. 11, this comprises an array of corner cubes (144) mounted on a support (146), generally similar to the target (17) shown in FIG. 2. However, target (140), unlike target (17), is divided into left and right segments (148) and (150). Left segment (148) is an array of twenty corner cubes (144) in five horizontal rows (152) each containing four corner cubes (144). Right segment (150) carries twelve corner cubes (144) arranged in three rows of four, opposite the top, centre and bottom rows (152) of left segment (148). In this way there are formed the right segment (150) two horizontal stripes (154) which are relatively non-reflective.

This enables detector (138) and control circuit (142) to distinguish whether reflected light is received from the right or left segments of target (140). If from left segment (148), the frequency of the pulses of reflected light will correspond to the rotation rate of motor (128); if from right segment (150), it will be three times higher. If this way control circuit (142) can analyse signals arriving at detector (138) and operate warning lights (156), (158) and (160) according to the following logic table:

| SIGNALS | EFFECT |
| --- | --- |
| Mainly from left | Switch on light (156), |
| segment (148) | "Left" |
| | Switch off other lights lit |
| Mainly from right | Switch on light (110), |
| segment (150) | "Right" |
| | Switch off other lights lit |
| From both segments (148) and (150) | Switch on light (158), "On Course" |
| | Switch off other lights lit |
| No signal | Switch off light (158), if lit |

A system of the type shown in FIGS. 10 and 11 gives a more concentrated beam and can operate over greater distances.

The invention further comprises a novel reflector target of the type shown in FIG. 11, that is to say, a portable target for serving as a laser beam reflector comprising a support carrying an array of corner cubes disposed for mounting in a vertical plane, the array comprising asymmetrical left and right segments, wherein one of said segments is divided into two or more reflective sub-arrays by one or more non-reflective horizontal bands.

Targets used in the invention may take other forms as well. For example, instead of the target shown in FIG. 3 a non-rectangular target might be used, e.g. a target in the form of an isosceles triangle with its base vertical. The system shown in FIGS. 10 and 11 might be modified by the use of a different target, consisting for example of two sides, the left-hand side comprising two horizontal rows of corner cubes and the right hand side comprising a single row. The orientation of the beam is then judged from the duration of the returning light signal, rather than its frequency: the signal returning from the left-hand side of the target lasts twice as long as that returning from the right-hand side.

When using targets of standard size and shape, and generating a beam signal which vibrates or rotates at constant speed, the duration of the returning signal is proportional to the distance of the laser from the target. If desired, this distance may be determined by electronic measurement of the duration of the signal of the reflected beam.

Instead of a system of fixed reflectors round a field, as shown in FIG. 8, it is possible to have only one target reflector at each edge of the field. These can then be moved into appropriate positions by a special vehicle which may if desired be automatically guided, e.g. by a wire or by other suitable mechanical, electrical or optical means.

I claim:

1. A system for guiding a vehicle along a predetermined rectilinear path on a substantially horizontal plane, which system comprises a vehicle having a laser fixed thereon so as to direct a laser beam along the direction of motion of the vehicle towards a target, beam reversing means comprising an array of corner cubes carried by said target and positioned on the vehicle path so as to direct the beam back to the vehicle, and means for spreading the laser beam substantially solely transverse to said plane, said spreading means being coupled to said vehicle.

2. A system as claimed in claim 1, wherein electronic detection means mounted on the vehicle for sensing the returning beam is provided and the electronic detection means is coupled to means controlling the direction of motion of the vehicle so that the vehicle may be steered automatically towards the target.

3. A system as claimed in claim 1 in which the vehicle is an agricultural tractor.

4. A system for guiding a vehicle along a predetermined rectilinear path which comprises a vehicle having a laser fixed thereon so as to direct a laser beam along the direction of motion of the vehicle towards a target, beam reversing means comprising an array of corner cubes carried by said target and positioned on the vehicle path so as to direct the beam back to the vehicle and means for spreading the laser beam comprising a rotating reflection device, said spreading means being mounted on said vehicle and spreading said beam from 1-10 degrees in a substantially vertical plane, and further including receiving means, mounted on said vehicle, for receiving the beam reversed by said beam reversing means.

5. The system as claimed in claim 4 wherein said rotating reflection device is a mirror.

6. The system as claimed in claim 4 wherein said rotating reflection device is a prism.

* * * * *